United States Patent
Kim

(10) Patent No.: US 9,667,766 B2
(45) Date of Patent: May 30, 2017

(54) BLUETOOTH CONTROL SYSTEM AND METHOD THEREFOR

(71) Applicant: HYUNDAI MOTOR COMPANY, Seoul (KR)

(72) Inventor: Young Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/927,031

(22) Filed: Oct. 29, 2015

(65) Prior Publication Data

US 2016/0241698 A1    Aug. 18, 2016

(30) Foreign Application Priority Data

Feb. 16, 2015 (KR) .................. 10-2015-0023126

(51) Int. Cl.
| | | |
|---|---|---|
| *H04M 1/725* | (2006.01) | |
| *H04W 4/00* | (2009.01) | |
| *H04B 1/3822* | (2015.01) | |

(52) U.S. Cl.
CPC ........ *H04M 1/7253* (2013.01); *H04B 1/3822* (2013.01); *H04M 1/72569* (2013.01); *H04M 1/72577* (2013.01); *H04W 4/008* (2013.01); *H04M 2250/02* (2013.01)

(58) Field of Classification Search
CPC ... H04M 1/7253; H04B 1/3822; H04W 4/008
USPC .................................. 455/41.2, 569.2, 575.9
See application file for complete search history.

(56) References Cited

U.S. PATENT DOCUMENTS

| | | | | |
|---|---|---|---|---|
| 2004/0055110 A1* | 3/2004 | Breed | .................. | E05C 17/203 16/82 |
| 2015/0365979 A1* | 12/2015 | Park | .................... | H04W 76/007 455/404.2 |

FOREIGN PATENT DOCUMENTS

| | | |
|---|---|---|
| JP | 2005-268933 A | 9/2005 |
| JP | 2006-287644 A | 10/2006 |
| JP | 2011-087026 A | 4/2011 |
| JP | 2014-021903 A | 2/2014 |
| JP | 2014-060675 A | 4/2014 |
| KR | 10-2011-0114042 A | 10/2011 |
| KR | 10-2013-0021976 A | 3/2013 |
| KR | 10-2014-0052230 A | 5/2014 |
| KR | 10-2015-0012481 A | 2/2015 |

OTHER PUBLICATIONS

Korean Office Action dated Jun. 27, 2016, issued in Korean Patent Application No. 10-2015-0023126.

* cited by examiner

*Primary Examiner* — Tuan Pham
(74) *Attorney, Agent, or Firm* — McDermott Will & Emery LLP

(57) ABSTRACT

A Bluetooth control system includes a head unit for acquiring a door open or closed signal from doors of a vehicle when the doors are opened or closed. The head unit selectively turns on or off Bluetooth connection of a mobile device using a set application based on the door open or closed signal.

11 Claims, 3 Drawing Sheets

BLUETOOTH CONTROL SYSTEM AND METHOD THEREFOR

CROSS-REFERENCE TO RELATED APPLICATION

This application claims priority to and the benefit of Korean Patent Application No. 10-2015-0023126, filed on Feb. 16, 2015 in the Korean Intellectual Property Office, the disclosure of which is hereby incorporated by reference as if fully set forth herein.

TECHNICAL FIELD

The present disclosure relates to a Bluetooth control system and a method therefor and, more particularly, to a Bluetooth control system for automatically turning on or off Bluetooth connection using an application of a mobile device when doors of a vehicle are opened or closed, and a method therefor.

BACKGROUND

Currently, many people own vehicles due to development of the automotive industry and prosperity in living, and media content of a mobile device, e.g., MP3, audio or video files, can be reproduced by a head unit of a vehicle through Bluetooth pairing.

Accordingly, Bluetooth pairing is used to receive data from the mobile device, to display the data on the head unit, and to transmit data such as MP3 or media files or an address book. Since battery consumption is high if Bluetooth connection of the mobile device is always on, Bluetooth connection of a smartphone is ordinarily turned off and should be manually turned on after the driver gets in the vehicle. As such, inconvenience can be caused.

RELATED ART DOCUMENT

Patent Document

KR 10-2012-0111501 (Oct. 10, 2012.)

SUMMARY

Accordingly, the present invention is directed to a Bluetooth control system and a method therefor which substantially obviate one or more problems due to limitations and disadvantages of the related art.

An object of the present invention is to provide a Bluetooth control system for automatically transmitting a door open or closed signal from a head unit to a mobile device when doors of a vehicle are opened or closed, to automatically turn on or off Bluetooth connection between the head unit and the mobile device using an application installed in the mobile device to control the vehicle by a driver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a Bluetooth control system includes a head unit for acquiring a door open or closed signal from doors of a vehicle when the doors are opened or closed. The head unit may selectively turn on or off Bluetooth connection of a mobile device via a set application based on the door open or closed signal.

The head unit may include a communication unit for acquiring the door open or closed signal.

The Bluetooth control system may further include a remote control center for controlling at least one of point of interest (POI) information, automatic response system (ARS) voice information, vehicle management, and vehicle positioning via an application of the mobile device.

The communication unit may transmit the door open or closed signal generated from the doors of the vehicle when the doors are opened or closed, to the head unit.

The head unit may transmit the door open or closed signal to the remote control center via vehicle telematics means.

The head unit may be connected to the remote control center by at least one of long term evolution (LTE) communication, $3^{rd}$ generation (3G) communication, and code division multiple access (CDMA).

The remote control center may receive the door open or closed signal of the vehicle from the head unit, and transmit a Bluetooth on signal to the mobile device for Bluetooth pairing between the head unit and the mobile device.

The head unit may scan for the mobile device existing in the vehicle based on a Bluetooth on state of the mobile device.

The head unit may transmit a preset pin number to the mobile device, and achieve Bluetooth pairing with the mobile device by authenticating the pin number.

When Bluetooth pairing is established with the head unit, the mobile device may transmit a Bluetooth pairing state feedback signal to the remote control center via an application.

If the mobile device does not exist in the vehicle, the head unit may transmit a Bluetooth off feedback signal to the remote control center.

When the doors of the vehicle are changed to a lock state after an engine of the vehicle is turned off, the head unit may transmit the door open or closed signal to the remote control center to turn off Bluetooth pairing of the mobile device.

In another aspect of the present invention, a Bluetooth control method includes a door unlock step for transmitting a door open or closed signal to a head unit when doors of a vehicle are opened or closed, a Bluetooth on request step for transmitting the door open or closed signal to a remote control center via vehicle telematics means of the head unit, a mobile device existence determination step for scanning for a mobile device existing in the vehicle, by the head unit, a mobile device detection step for transmitting a preset pin number to the mobile device if the mobile device is detected in the mobile device existence determination step, and a detection result checking step for inputting the pin number to the mobile device to establish Bluetooth connection with the head unit.

The door unlock step may include transmitting the door open or closed signal to the head unit using the communication unit when the doors of the vehicle are opened or closed.

The Bluetooth on request step may include transmitting a Bluetooth pairing request signal based on the door open or closed signal to the remote control center using the vehicle telematics means of the head unit, to transmit a Bluetooth on request signal to the mobile device.

The Bluetooth on request step may include transmitting a Bluetooth on state signal of the mobile device to the head unit and scanning for the mobile device existing in the vehicle.

The mobile device existence determination step may include, if the mobile device does not exist in the vehicle when the head unit scans for the mobile device, transmitting a Bluetooth off signal of the mobile device to the remote control center to change the mobile device to a Bluetooth off state.

The mobile device detection step may include collecting information about the mobile device detected by the head unit, and displaying the information about the mobile device on the head unit.

The detection result checking step may include, if Bluetooth pairing is established between the head unit and the mobile device using a preset pin number, transmitting information about Bluetooth pairing to the remote control center.

In another aspect of the present invention, a Bluetooth control method includes a door lock step for determining an open or closed state of doors of a vehicle after an engine of the vehicle is turned off, a Bluetooth off request step for transmitting a door open or closed signal to a remote control center using telematics means of a head unit, and a request result checking step for transmitting a Bluetooth off signal to a mobile device based on the door open or closed signal received from the head unit.

The door lock step may include transmitting an engine off signal of the vehicle and the door open or closed signal to the head unit using a communication unit.

The Bluetooth off request step may include changing a Bluetooth on state of the mobile device to a Bluetooth off state based on a Bluetooth off request of the mobile device received from the head unit.

The request result checking step may include, when a Bluetooth pairing state of the mobile device is changed to the Bluetooth off state, transmitting a feedback signal thereof to the remote control center.

In another aspect of the present invention, a Bluetooth control method includes acquiring a door open or closed signal from a door of the vehicle and transmitting the acquired door open or closed signal to a remote center, by a head unit of the vehicle, upon receiving the door open or closed signal form the head unit of the vehicle, transmitting, by the remote center, a Bluetooth on or off signal corresponding to the received door open or closed signal to a mobile device associated with the head unit of the vehicle, turning on or off Bluetooth, by the mobile device, of the mobile device in response to the received Bluetooth on or off signal from the remote center, and establishing Bluetooth communication between the head unit of the vehicle and the mobile device if the Bluetooth of the mobile device is turned on.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
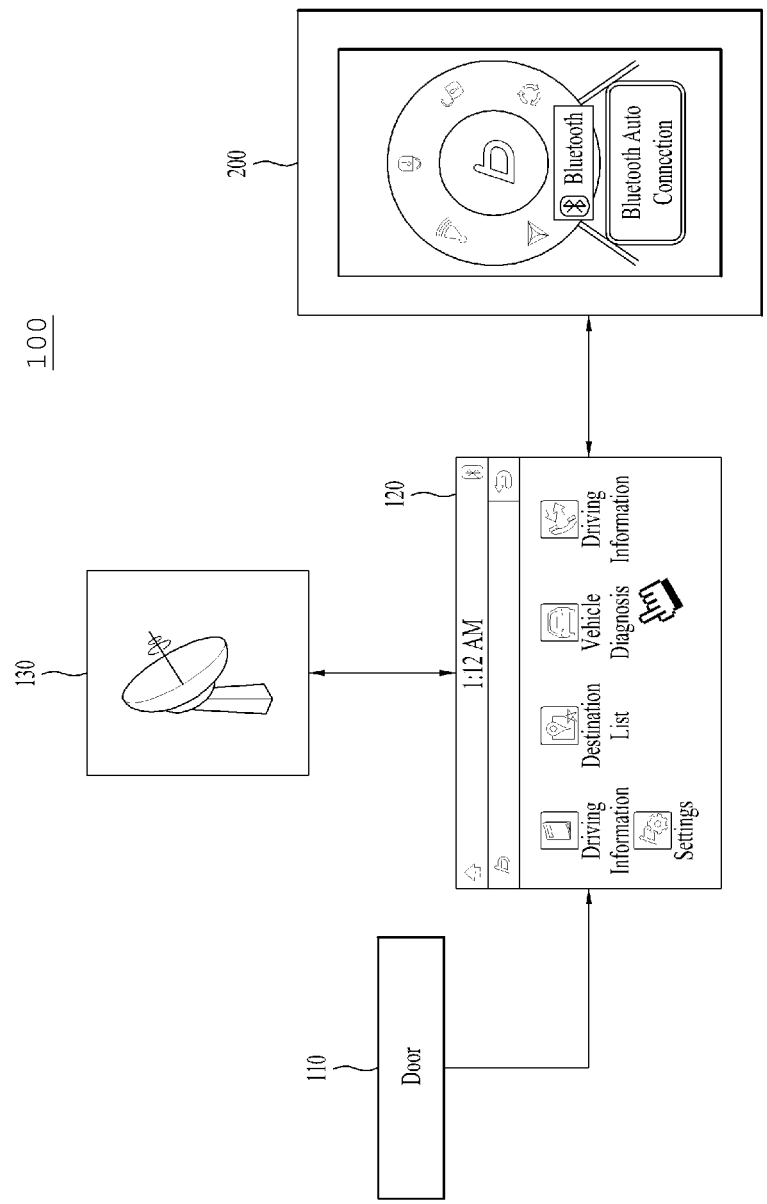
FIG. 1 is a block diagram of a Bluetooth control system according to an embodiment of the present invention.

Hereinafter, the present invention will be described in detail by explaining embodiments of the invention with reference to the attached drawings. Like reference numerals in the drawings denote like elements. In the following description of the present invention, a detailed description of known functions and configurations incorporated herein will be omitted when it may make the subject matter of the present invention unclear. Some features shown in the drawings can be enlarged, reduced or simplified for convenience of explanation, and all elements of the drawings are not always illustrated with accurate ratios. However, this can be easily understood by one of ordinary skill in the art.

Figure 2:
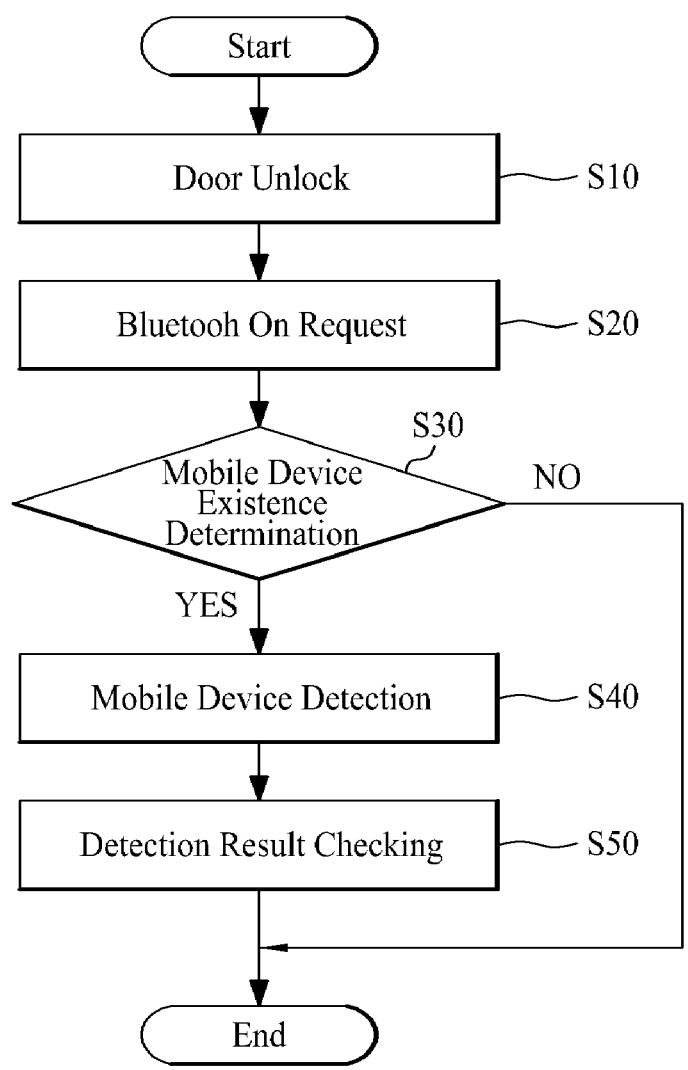
FIG. 2 is a flowchart of an automatic on method in a Bluetooth control method of the Bluetooth control system, according to an embodiment of the present invention.
Figure 3:
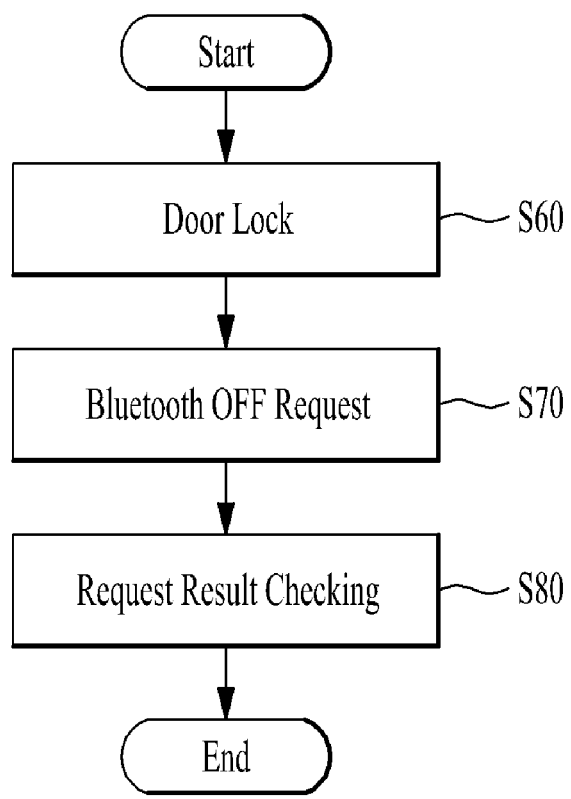
FIG. 3 is a flowchart of an automatic off method in the Bluetooth control method of the Bluetooth control system, according to an embodiment of the present invention.

FIG. 1 is a block diagram of a Bluetooth control system 100 according to an embodiment of the present invention, FIG. 2 is a flowchart of an automatic on method in a Bluetooth control method of the Bluetooth control system 100, according to an embodiment of the present invention, and FIG. 3 is a flowchart of an automatic off method in the Bluetooth control method of the Bluetooth control system 100, according to an embodiment of the present invention.

As illustrated in FIG. 1, the Bluetooth control system 100 includes a plurality of doors 110 for opening or closing the inner space of a vehicle, a head unit 120 included in the vehicle to store or execute a digital map, point of interest (POI) information, MP3 files and media files, a control center 130 for providing wireless data service while the vehicle is moving, and a mobile device 200 for exchanging data such as a phone address book, MP3 files and media files with the head unit 120 using a set communication method. The mobile device 200 may be a registered mobile device with the head unit 120 of the vehicle, or the mobile device 200 may be preregistered at the control center 130 that a driver or a passenger of the vehicle owns the mobile device 120.

The head unit 120 is configured to provide audio service for receiving AM/FM radio broadcast signals or reproducing MP3 files stored in a storage medium or audio files stored in a music CD, video service for reproducing video files stored in a storage medium and having formats such as avi and mpeg, and navigation service for guiding the vehicle using global positioning system (GPS) information.

Application programs for the audio, video and navigation services are stored in memory (not shown) of the head unit 120 and can be executed upon input of a driver, e.g., manipulation of a user interface (UI) of a touchscreen-type display device of the head unit 120. Each application program is loaded from the memory and then is executed by a controller.

Furthermore, the head unit 120 may include a Bluetooth module (not shown) and a Wi-Fi module (not shown) to exchange data with the mobile devices 200, and thus store multimedia content such as video and music in the memory in the form of files. The memory may be implemented as, for example, USB memory, a memory stick, an SD card or an external hard disk drive, and stores multimedia files such as video, photos and music.

The head unit 120 allows access of only an authorized user by authenticating the mobile device 200 accessed using a preset pin number through Bluetooth communication with the mobile device 200, stores small or large data of the media files in the mobile device 200, finds and outputs a media file using the stored data if a keyword for finding the media file is input to the head unit 120, and reads and reproduces the selected media file.

Accordingly, the head unit 120 may exchange data with the mobile device 200 through Bluetooth communication, and uses the control center 130 provided by the manufacturer of the vehicle.

The control center 130 provides telematics service for checking electrical devices of the vehicle, performing vehicle diagnosis, managing consumables of the vehicle, reporting routine maintenance, providing vehicle SOS service, and collecting vehicle status information from the head unit 120 or the mobile device 200 for tracking the vehicle when stolen.

Accordingly, the control center 130 may provide a vehicle control signal acquired from the head unit 120, to the mobile device 200 of the driver accessed at a remote place to check the status of the vehicle.

The Bluetooth control system 100 according to the present invention may reduce battery consumption of the mobile device 200 and prevent vehicle accidents caused by manipulation of the mobile device 200 while driving by automatically turning on or off Bluetooth connection between the head unit 120 and the mobile device 200.

A communication unit (not shown) may be used to transmit a vehicle electrical control signal to the head unit 120 when the doors 100 are opened or closed by the driver. The communication unit receives and transmits a door open or closed signal of the doors 110 to the head unit 120, and thus the head unit 120 transmits the door open or closed signal to the control center 130 using telematics means such as long term evolution (LTE) communication, $3^{rd}$ generation (3G) communication, or code division multiple access (CDMA).

Accordingly, after the control center 130 determines the mobile device 200 that is registered with the head unit 120 of the vehicle, the control center 130 acquires and transmits the door open or closed signal to the mobile device 200 of the driver, and automatically turns on Bluetooth connection using an application of the mobile device 200.

Subsequently, the control center 130 may transmit a message including a Bluetooth on request from the mobile device 200, to the head unit 120 to detect the mobile devices 200 using the Bluetooth module included in the head unit 120, and display a list of the mobile devices 200 detected by the Bluetooth module, on the head unit 120 to selectively connect the mobile device 200 upon touch of the driver.

As such, the head unit 120 detects the mobile devices 200 existing in the vehicle or Bluetooth-connectable external devices and Bluetooth connection is established between the head unit 120 and the mobile device 200 by transmitting a preset pin number from the head unit 120 to the mobile device 200 to authenticate the mobile device 200. If the mobile device 200 does not exist in the vehicle, Bluetooth off feedback information is transmitted to the control center 130.

When Bluetooth connection is normally established with the head unit 120, the mobile device 200 transmits feedback information thereof to the control center 130. Thus, the control center 130 scans whether Bluetooth communication between the head unit 120 and the mobile device 200 is normally performed.

Furthermore, when the doors 110 of the vehicle are changed to a locked state after the engine of the vehicle is turned off, a lock signal of the doors 110 is transmitted to the control center 130 using the telematics means of the head unit 120, the activated Bluetooth connection of the mobile device 200 is turned off to terminate connection with the head unit 120, and Bluetooth off feedback information is transmitted to the control center 130.

As such, due to the above-described configuration, the Bluetooth control system 100 may reduce battery consumption of the mobile device 200 by automatically turning on or off Bluetooth connection of the mobile device 200, and may prevent vehicle accidents caused by unnecessary behavior while driving by not manually turning on or off Bluetooth connection between the head unit 120 and the mobile device 200.

A description is now given of a Bluetooth control method for implementing the present invention using the above-described Bluetooth control system 100.

As illustrated in FIG. 2, the Bluetooth control method is performed by the head unit 120 for providing audio service for reproducing MP3 files stored in the mobile device 200 or an external device or audio files stored in a music CD, video service for reproducing video files stored in the mobile device 200 and having formats such as avi and mpeg, and navigation service for guiding the vehicle using GPS information, the control center 130 for checking and managing electrical devices of the vehicle and vehicle status information using the telematics means of the head unit 120, and the mobile device 200 having installed therein an application provided by Hyundai Motor Company to transmit the vehicle status information provided from the head unit 120, to the driver.

The Bluetooth control method according to the present invention includes a door unlock step S10 for transmitting a door open or closed signal to the head unit 120 when the driver opens or closes the doors 110 of the vehicle, a Bluetooth on request step S20 for transmitting the door open or closed signal to the control center 130 using the telematics means of the head unit 120, a mobile device existence determination step S30 for scanning for the mobile device 200 existing in the vehicle by the head unit 120, a mobile device detection step S40 for transmitting a preset pin number from the head unit 120 to the mobile device 200 if the mobile device 200 is detected in the mobile device existence determination step S30, and a detection result checking step S50 for inputting the pin number to the mobile device 200 to establish Bluetooth connection with the head unit 120.

In the door unlock step S10, when the doors 110 are opened or closed using a smart key or the mobile device 200, the door open or closed signal is transmitted to the head unit 120 using the communication unit for controlling electrical devices of the vehicle.

Accordingly, in the door unlock step S10, if the door open or closed signal acquired from the doors 110 is input to the head unit 120, the head unit 120 executes the telematics means for connection with the control center 130.

In the Bluetooth on request step S20, the door open or closed signal is transmitted to the control center 130 using the telematics means of the head unit 120, and the control center 130 having received the door open or closed signal displays a popup window to be viewed by the driver on the mobile device 200 to turn on Bluetooth connection using an application of the mobile device 200.

Accordingly, in the Bluetooth on request step S20, Bluetooth connection of the mobile device 200 is maintained in an on state, information thereof is transmitted to the head unit 120, and the Bluetooth module of the head unit 120 scans for the mobile device 200.

In the mobile device existence determination step S30, the head unit 120 determines whether the mobile device 200 is detected, and a Bluetooth off signal of the mobile device 200 is transmitted to the control center 130 to change the mobile device 200 to a Bluetooth off state if the mobile device 200 does not exist in the vehicle.

In the mobile device detection step S40, the head unit 120 collects a unique number of the detected mobile device 200, and displays the type of the collected mobile device 200 on the head unit 120.

Accordingly, in the mobile device detection step S40, the mobile device 200 or a Bluetooth-connected external device is detected and displayed on the head unit 120. By displaying information about the mobile device 200 to the driver, whether Bluetooth connection between the head unit 120 and the mobile device 200 is normally turned on may be determined.

In the detection result checking step S50, if the driver makes a selection on a list displayed on the head unit 120 in the mobile device detection step S40, the head unit 120 transmits a preset pin number to the mobile device 200.

The above operation is performed to protect private information of the head unit 120 or the mobile device 200 using encrypted code by inputting a pin number for accessing the head unit 120 to the mobile device 200.

Furthermore, in the detection result checking step S50, when the head unit 120 is connected to the mobile device 200 using the preset pin number, a Bluetooth connection feedback signal is transmitted to the control center 130.

A Bluetooth off request method based on the above-described Bluetooth control method is now described with reference to FIG. 3.

The Bluetooth off request method includes a door lock step S60 for determining a lock state of the doors 110 after the engine of the vehicle is turned off, a Bluetooth off request step S70 for transmitting a door lock signal indicating the lock state of the doors 110 to the head unit 120, and transmitting the door lock signal to the control center 130, and a request result checking step S80 for transmitting a Bluetooth off signal from the control center 130 to the mobile device 120 based on the door lock signal received from the head unit 120.

In the door lock step S60, an engine off signal of the vehicle and a door lock signal of the doors 110 are transmitted to the head unit 120 using the communication unit of the vehicle.

Accordingly, in the door lock step S60, the head unit 120 prepares to transmit the received door lock signal to the control center 130.

In the Bluetooth off request step S70, a Bluetooth on state of the mobile device 200 is changed to a Bluetooth off state based on an off request signal received from the control center 130, using an application of the mobile device 200.

Accordingly, in the Bluetooth off request step S70, the mobile device 200 is changed to the Bluetooth off state to minimize battery consumption of the mobile device 200.

In the request result checking step S80, when the mobile device 200 is changed to the Bluetooth off state, a feedback signal thereof is transmitted to the control center 130. As such, whether Bluetooth connection between the head unit 120 and the mobile device 200 is normally turned off may be determined.

In a Bluetooth control system and a method therefor according to the present invention, since Bluetooth connection of a mobile device is not always turned on, battery consumption of the mobile device may be minimized. Furthermore, since Bluetooth connection of the mobile device is automatically turned on or off even when a driver does not control or manipulate the mobile device after the driver gets in a vehicle or while the driver is driving the vehicle, vehicle accidents may be prevented.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A Bluetooth control system comprising:
   a head unit for acquiring a door open or closed signal from doors of a vehicle when the doors are opened or closed; and
   a remote control center for controlling at least one of point of interest (POI) information, automatic response system (ARS) voice information, vehicle management, and vehicle positioning via an application of a mobile device,
   wherein the head unit selectively turns on or off Bluetooth connection of the mobile device via a set application based on the door open or closed signal, and
   wherein the head unit transmits the door open or closed signal to the remote control center via vehicle telematics means.

2. The Bluetooth control system according to claim 1, wherein the head unit comprises a communication unit for acquiring the door open or closed signal.

3. The Bluetooth control system according to claim 2, wherein the communication unit transmits the door open or closed signal generated from the doors of the vehicle when the doors are opened or closed, to the head unit.

4. The Bluetooth control system according to claim 1, wherein the head unit is connected to the remote control center by at least one of long term evolution (LTE) communication, $3^{rd}$ generation (3G) communication, and code division multiple access (CDMA).

5. The Bluetooth control system according to claim 1, wherein the remote control center receives the door open or closed signal of the vehicle from the head unit, and transmits a Bluetooth on signal to the mobile device for Bluetooth pairing between the head unit and the mobile device.

6. The Bluetooth control system according to claim 5, wherein the head unit scans for the mobile device existing in the vehicle based on a Bluetooth on state of the mobile device.

7. The Bluetooth control system according to claim 6, wherein the head unit transmits a preset pin number to the mobile device, and achieves Bluetooth pairing with the mobile device by authenticating the pin number.

8. The Bluetooth control system according to claim 7, wherein, when Bluetooth pairing is established with the head unit, the mobile device transmits a Bluetooth pairing state feedback signal to the remote control center via an application.

9. The Bluetooth control system according to claim 7, wherein, if the mobile device does not exist in the vehicle, the head unit transmits a Bluetooth off feedback signal to the remote control center.

10. The Bluetooth control system according to claim 7, wherein, when the doors of the vehicle are changed to a locked state after an engine of the vehicle is turned off, the head unit transmits the door open or closed signal to the remote control center to turn off Bluetooth pairing of the mobile device.

11. A Bluetooth control method comprising:
- a door lock step for determining an open or closed state of doors of a vehicle after an engine of the vehicle is turned off;
- a Bluetooth off request step for transmitting a door open or closed signal to a remote control center using telematics means of a head unit; and
- a request result checking step for transmitting a Bluetooth off signal to a mobile device based on the door open or closed signal received from the head unit.

* * * * *